UNITED STATES PATENT OFFICE.

IDA L. McDERMETT, OF BAIRD, TEXAS.

PREPARING FRUIT FOR CANNING AND PRESERVING.

SPECIFICATION forming part of Letters Patent No. 511,709, dated December 26, 1893.

Application filed May 6, 1893. Serial No. 473,294. (No specimens.)

*To all whom it may concern:*

Be it known that I, IDA L. MCDERMETT, a citizen of the United States, residing at Baird, in the county of Callahan and State of Texas, have invented new and useful Improvements in Processes of Preparing Fruit for Canning and Preserving, of which the following is a specification.

This invention has for its object to provide a new process or method of removing the skin from peaches, pears, and other fruit, and placing the latter in good condition for preserving and various other purposes.

To accomplish this object my invention consists in subjecting the fruit, while being agitated, to the action of a boiling solution of potash and alum until the skin commences to break or peel, then removing the fruit and immediately, or while hot, dropping or introducing the fruit into a body of cold water, and subsequently rinsing in another body of water, wiping off with a cloth, and finally bathing in clear water to prevent the fruit from turning or becoming dark.

In carrying my invention into effect I prepare the solution by introducing one ounce of potash and one dram of alum into one gallon of water, and boil the latter until the potash and alum are dissolved; and into this boiling solution I place the peaches, pears, or other fruit, and subject all to agitation until the skin of the fruit commences to break or peel, when the fruit is removed through the medium of a perforated dipper, basket or strainer, and is dropped or introduced immediately, or while hot, into a body of cold water, which completes the removal of the skin, and removes a large portion of the solution from the articles. The fruit is then removed from the cold water through the medium of a perforated dipper, basket or strainer and placed in another body of cold water, and after removal therefrom is wiped off with a cloth, and is finally introduced into clear water for the purpose of preventing the fruit from turning or becoming dark. This order of procedure is very effective in removing the skin from peaches, pears, and other fruit, and places the latter in good condition for preserving and various other purposes.

The proportions hereinbefore stated are merely given as an example of proportions which will be found satisfactory in use. I do not wish to be understood as confining myself to the exact proportions stated.

Having thus described my invention, what I claim is—

The process or method herein described of removing skin from fruit, which consists in subjecting the fruit, while being agitated, to the action of a boiling solution of potash and alum until the skin commences to break or peel, then removing the fruit and immediately, or while hot, introducing the same into cold water, and subsequently rinsing in another body of water, wiping off with a cloth, and finally bathing in a body of cold water to prevent the fruit from turning or becoming dark, substantially as set forth.

In testimony whereof I have hereunto set my hand in presence of two subscribing witnesses.

IDA L. McDERMETT.

Witnesses:
W. R. McDERMETT,
J. H. LEECH.